United States Patent Office 3,532,245
Patented Oct. 6, 1970

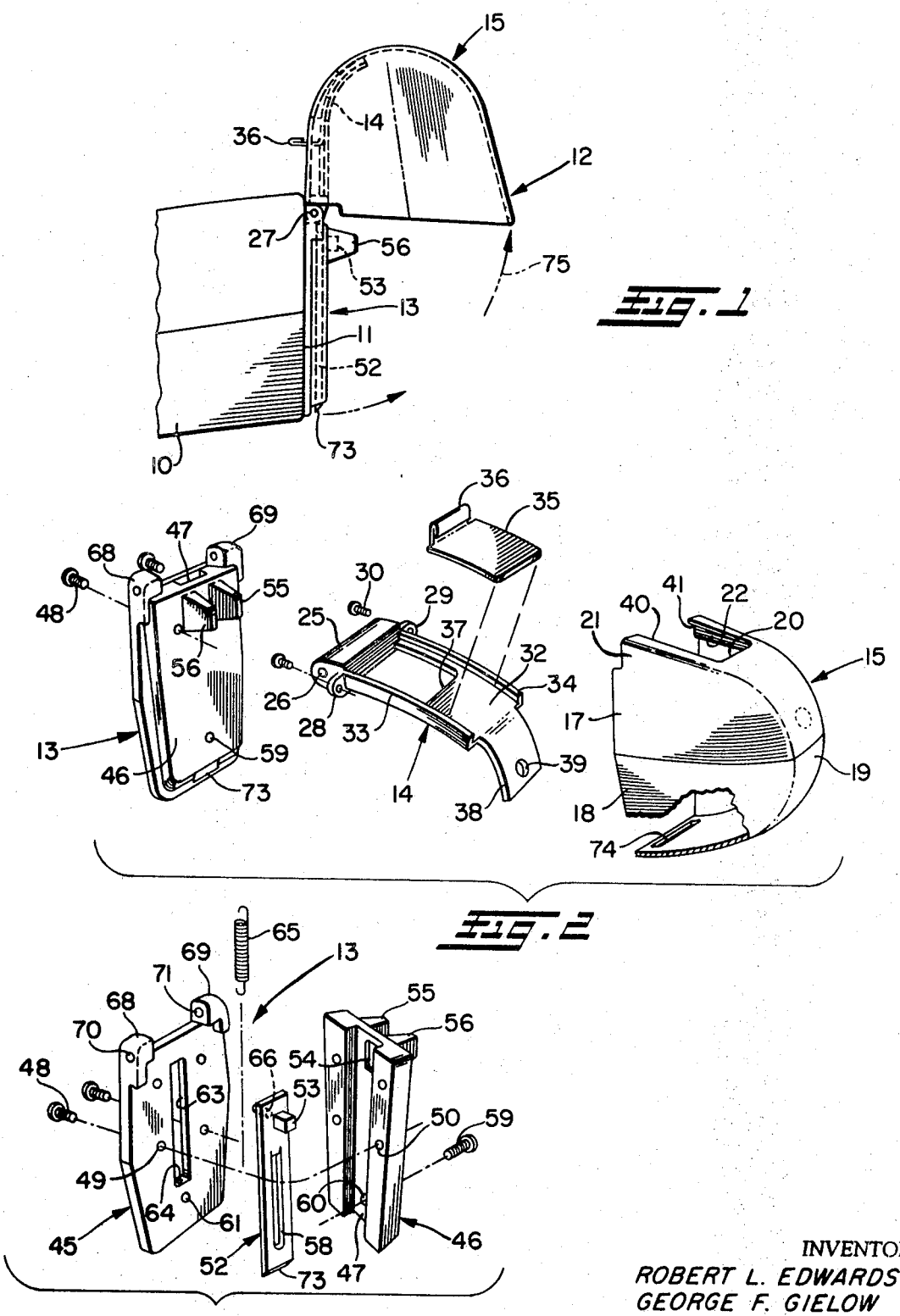

3,532,245
ASH RECEIVER
Robert L. Edwards and George F. Gielow, Mansfield, Ohio, assignors to National Seating Company, Mansfield, Ohio, a corporation of Ohio
Filed Oct. 14, 1968, Ser. No. 767,081
Int. Cl. A24f *19/08;* B60n *3/08*
U.S. Cl. 220—18                                          10 Claims

ABSTRACT OF THE DISCLOSURE

An ash receiver adapted to form the distal end of a vehicle seat arm including a mounting plate assembly having a spring loaded tongue, a shell pivoted to the mounting plate assembly with an interior groove cooperating with the tongue to hold the shell in closed position.

---

This invention relates generally as indicated to an ash receiver and more particularly to an ash receiver adapted to form the outer end of the vehicle seat arm although it will be appreciated that the ash receiver may be mounted in other places convenient to the user.

In ash receivers, particularly those used in public transportation vehicles, there is a continuing problem in vehicle cleaning and maintenance in that the contents of the ash receiver must be capable of being easily and conveniently removed. However, the ash receiver should not be so easily opened that a user could inadvertently dump the contents.

It is accordingly a principal object of the present invention to provide a vehicle seat ash receiver which can be positively locked in the closed position and yet which can readily be opened by maintenance personnel.

Another important object is the provision of a simplified vehicle seat ash receiver wherein the unlocking latch mechanism is accessible only through the access door of the receiver.

Another object is the provision of a vehicle seat ash receiver which is pivoted at its upper end so that the contents can readily be dumped when the receiver is unlatched.

A further object is the provision of a vehicle seat ash receiver which includes a mounting back plate assembly having a spring loaded tongue therein cooperating with a groove in the receiver shell pivoted to such assembly.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative of but one of the various ways in which the principle of the invention may be employed.

In said annexed drawing:

FIG. 1 is a fragmentary side elevation of an ash receiver in accordance with the present invention mounted on the end of a vehicle seat arm and shown in its open or contents dumping position;

FIG. 2 is an exploded view of the ash receiver shown in FIG. 1; and

FIG. 3 is an exploded view of the mounting back plate sub-assembly.

Referring first to FIG. 1 there is illustrated a vehicle seat arm 10 having a flat end wall 11 on which is mounted the ash receiver shown generally at 12.

Such ash receiver includes a mounting back plate sub-assembly generally illustrated at 13, a door guide and shell pivot depicted generally at 14, and an ash receiver shell 15, as seen more clearly in FIG. 2. The shell 15 comprises a substantially planar continuation of the arm 10 including opposite side walls 17 and 18 joined by a semi-circular end wall 19, the upper and lower surfaces of which are substantial continuations of the top and bottom of the arm 10. The top or upper portion of the end wall is provided with a rectangular cut-out from its upper extremity as seen at 20 and such wall is enlarged laterally subjacent such cut-out at 21 and 22. The door guide and shell pivot 14 is secured within such cut-out with the enlarged lateral edges 21 and 22 straddling the same.

The door guide includes a hinge block 25 having a horizontal bore 26 therethrough adapted to accommodate hinge pin 27. Projecting laterally and slightly forwardly of the hinge block are gears 28 and 29 through which fasteners 30 extend into the enlarged lateral side walls 21 and 22 of the shell 15 to secure the shell to the door guide and shell pivot 14.

The main plate 32 of the guide 14 includes upstanding lateral lips 33 and 34 between which fits the sliding door 35, the latter including an upstanding rebent tab 36 to facilitate the sliding operation thereof. A recess or cut-out 37 of slightly less width than the width of the plate between the lips 33 and 34 is provided as a snuffer opening. The plate 32 of the guide 14 includes a curved extending tab 38 fitting closely within the interior of the outer curved wall 19 of the shell and an additional fastening means such as a rivet or tack weld may be provided through the opening 39. In assembly the door 35 will be positioned between the lips 33 and 34 and then the door guide 14 will be assembled to the shell with the laterally inwardly extending lips 40 and 41 of the cut-out 20 overlying the upstanding lips 33 and 34 retaining the door in the door guide and shell pivot 14.

As seen more clearly in FIG. 3, the mounting back plate assembly 13 includes a back plate 45 and a front plate 46, the rear of the latter being provided with a vertical slot 47. The front and back plates may be held together in their assembled condition by suitable fasteners 48 passing through apertures 49 in the back plate and into tapped holes 50 in the front plate, such apertures and tapped holes being positioned laterally of the slot 47.

Prior to assembly a vertically extending tongue 52 is positioned in the slot, such tongue including a forwardly projecting tongue operator 53 which fits through vertically elongated opening 54 in the front plate 46. Such slot is positioned between forwardly projecting snuffer ears 55 and 56 which project forwardly immediately beneath the snuffer opening 37.

The tongue 52 is provided with a vertical slot 58 and a fastener 59 extends through aperture 60 in the front plate, through such vertical slot 58 and through aperture 61 in the back plate 45 to secure the mounting back plate assembly 13 to the end of the arm 10.

The back plate 45 is provided with a vertical slot 63 in the lower end of which at 64 is secured the lower end of tension spring 65, the upper end being secured to spring pin 66 projecting from the rear of the latching tongue 62. The spring urges the tongue downwardly to the extent permitted by the vertical length of the slot 54 in the front plate 46 through which the operator 53 projects.

At the top corners of the back plate 45 there is provided hinge pin bosses 68 and 69 having aligned apertures 70 and 71, respectively, through which extend the outer ends of the hinge pin 27. The distance between the bosses is, of course, sufficient to accommodate the hinge block 25.

In its bottomed position the lower end 73 of the latching tongue 52 projects from the bottom of the slot 47 as seen more clearly in FIGS. 1 and 2 and is beveled or cammed automatically to snap into latching groove 74 in the interior lower portion of the shell 15 as seen in FIG. 2 as the shell is closed. The peripheral side and lower edges of the front plate 46 are slightly beveled to pilot or telescope within the interior of the shell 15 firmly seating the same when the shell is closed to preclude lateral movement.

When maintenance personnel wish to clean the receiver or remove contents therefrom the door 35 is simply opened and with an index finger the operator 53 is lifted to elevate the latching projection 73 which then frees the shell for pivotal movement to the position seen in FIG. 1 as indicated by the arrow 75. The contents may then simply be dumped into a wastebasket or receptacle therebeneath. When the operator 53 is released the latching tongue will again extend downwardly to the extent permitted and the shell need only be pivoted in a clockwise direction as viewed in FIG. 1 with the latching tongue automatically cam latch engaging the groove 74 firmly to secure the shell in its closed position.

It can now be seen that there is provided an ash receiver adapted to be mounted on the end of the vehicle seat arm which cannot inadvertently be opened and yet can readily be opened by maintenance personnel quickly and efficiently to remove the contents. Such receiver is of a simplified structure and design incorporating a spring loaded matching tongue in a mounting back plate assembly which is secured to the end of such arm.

Other modes of applying the principles of the invention may be employed, change being made as regards the details described, provided the features stated in any of the following claims or the equivalent of such be employed.

We, therefore, particularly point out and distinctly claim as our invention:

1. An ash receiver including a mounting plate assembly adapted to be mounted on the end of the vehicle seat arm, a shell pivoted to said mounting plate assembly at the upper end thereof, an access opening in said shell adjacent the pivotal connection to said mounting plate assembly, a spring loaded latching tongue in said mounting plate assembly, and a groove in the interior of said shell at the lower end thereof cooperating with said tongue releasably to hold said shell in closed position.

2. An ash receiver as set forth in claim 1 wherein said shell includes a door guide hingedly connected to said mounting plate assembly, and a sliding door adapted to open and close such access opening mounted in said door guide.

3. An ash receiver as set forth in claim 1 wherein said mounting plate assembly includes a front and back plate, said locking tongue being vertically elongated and mounted for vertical sliding movement in a slot between said front and back plates.

4. An ash receiver as set forth in claim 1 including an operator for said locking tongue projecting through said mounting plate assembly into said shell adjacent such access opening.

5. An ash receiver as set forth in claim 1 including a vertically elongated opening in said mounting plate assembly and a tongue operator projecting through such opening and accessible only through such access opening in the closed position of said shell, such opening permitting but limiting vertical movement of said locking tongue.

6. An ash receiver as set forth in claim 1 including a locking tongue operator projecting into said shell in the closed position thereof and accessible only through such access opening, said operator being adapted to be lifted to release the tongue from the groove.

7. An ash receiver as set forth in claim 1 wherein said spring loaded locking tongue projects downwardly from said mounting plate assembly, said tongue including a cam latch projecting end adapted to snap within such groove as said shell is swung about its hinge connection to the closed position.

8. An ash receiver as set forth in claim 1 wherein said mounting plate assembly includes a front plate adapted slightly to project within said shell in the closed position, thereof, said tongue projecting downwardly from said front plate to engage such groove.

9. An ash receiver as set forth in claim 1 wherein said mounting plate assembly includes a back plate having a vertical slot therein, and spring means in said slot interconnecting said back plate and said locking tongue operative to urge the latter to its shell latching position.

10. An ash receiver as set forth in claim 1 wherein said shell constitutes a substantial planar continuation of such arm, the top and bottom surfaces thereof being joined by a semi-circular projecting surface.

References Cited

UNITED STATES PATENTS

| | | | |
|---|---|---|---|
| 1,892,046 | 12/1932 | Fairle | 232—43.1 |
| 2,449,965 | 9/1948 | Bell | 297—194 X |
| 2,736,320 | 2/1956 | Roberts | 131—235 |
| 2,840,258 | 6/1958 | Caesar | 220—18 |
| 2,959,317 | 11/1960 | Aldridge | 220—41 X |

FOREIGN PATENTS 621,649   6/1961   Italy.

GEORGE E. LOWRANCE, Primary Examiner

U.S. Cl. X.R.

131—241; 206—19.5